United States Patent
Yang et al.

(10) Patent No.: US 12,127,172 B2
(45) Date of Patent: Oct. 22, 2024

(54) PERIODIC TIME SLOT SCHEDULING METHOD FOR WIRELESS NETWORK

(71) Applicant: WUHAN UNIVERSITY, Wuhan (CN)

(72) Inventors: Jianfeng Yang, Wuhan (CN); Chengcheng Guo, Wuhan (CN)

(73) Assignee: WUHAN UNIVERSITY, Wuhan (CN)

( * ) Notice: Subject to any disclaimer, the term of this patent is extended or adjusted under 35 U.S.C. 154(b) by 359 days.

(21) Appl. No.: 17/858,803

(22) Filed: Jul. 6, 2022

(65) Prior Publication Data
US 2023/0020589 A1 Jan. 19, 2023

(30) Foreign Application Priority Data
Jul. 12, 2021 (CN) .......................... 202110782542.9

(51) Int. Cl.
*H04W 72/0446* (2023.01)

(52) U.S. Cl.
CPC ................ *H04W 72/0446* (2013.01)

(58) Field of Classification Search
CPC .. H04W 72/0446; H04W 28/16; Y02D 30/70; H04L 5/0078
See application file for complete search history.

(56) References Cited

U.S. PATENT DOCUMENTS

| | | | |
|---|---|---|---|
| 6,982,987 B2 * | 1/2006 | Cain | H04W 72/542 370/444 |
| 2010/0189086 A1 * | 7/2010 | Kats | H04W 74/04 370/338 |
| 2012/0320881 A1 * | 12/2012 | Hong | H04B 7/2659 370/336 |
| 2017/0243485 A1 * | 8/2017 | Rubin | H04W 4/46 |

* cited by examiner

*Primary Examiner* — Habte Mered

(57) ABSTRACT

The present disclosure provides a periodic time slot scheduling method for a wireless network. The method includes: connecting a plurality of nodes by using a wireless network; constructing time slot parameter sets of nodes in the wireless network and an interval array between time slots of each of the nodes; calculating an acceptable total time interval of each of the nodes in the wireless network, selecting a node with a minimum acceptable total time interval in the wireless network as a time slot allocation node, allocating a time slot for each time slot request of the time slot allocation node, and allocating a time slot for each time slot request of a remaining node except the time slot allocation node in the wireless network; and detecting and determining a delay of time slot allocation.

5 Claims, 2 Drawing Sheets

PERIODIC TIME SLOT SCHEDULING METHOD FOR WIRELESS NETWORK

CROSS REFERENCE TO RELATED APPLICATION

This patent application claims the benefit and priority of Chinese Patent Application No. 202110782542.9, filed on Jul. 12, 2021, the disclosure of which is incorporated by reference herein in its entirety as part of the present application.

TECHNICAL FIELD

The present disclosure relates to the technical field of time slot allocation of a wireless network, and in particular, to a periodic time slot scheduling method for a wireless network.

BACKGROUND ART

With the rapid development of wireless network technologies, people can quickly and freely access and obtain Internet resources anytime and anywhere, which has greatly changed people's ways of communication and living. With the emergence of concepts such as "Internet Plus" and the Internet of Things, communication is not limited to people, but also extended to people and various hardware devices.

Wireless fidelity (Wi-Fi) devices adopt the IEEE802.11 protocol. A carrier sense multiple access/collision avoidance (CSMA/CA) mechanism adopted by a media access control (MAC) layer of the IEEE802.11 protocol will result in uncertainty of a transmission delay. This problem is particularly prominent in the fields with high requirements for real-time performance, such as the Internet of Things, factory automation control, and intelligent transportation.

Traditional demands for the real-time performance are mainly concentrated in the field of industrial control, for collecting running statuses of devices, sending control instructions, and the like. In such scenarios, there are very high requirements for response time, reliability and confidentiality of communication. In an industrial production environment, propagation of a wireless signal is easy to be interfered by noise of a production device during running. In the industrial field, real-time industrial control applications require data transmission reliability of more than 95%, and a signal transmission delay should not be greater than 1.5 times sensor sampling and processing time.

Unlike interference from factory noise, there are a variety of different network protocols and devices running in free public frequency bands (2.4G and 5G). In such a hybrid wireless network, due to a large number of nodes and running of different network protocols, there is a great possibility of node and protocol collision. In addition, data packets in the field of industrial control are mainly used to transmit control information. In this scenario, there are only a small number of data frames and a packet length is small, which does not require a too high transmission rate. However, new fields such as the Internet of Things like smart city and smart home, and "Internet Plus" require a relatively high data transmission rate. Therefore, the IEEE802.15.4 protocol widely used in an industrial control network obviously cannot meet design requirements of a hybrid network in a new scenario, such as a high rate and high real-time performance.

Therefore, current channel time slot allocation in a Wi-Fi wireless network has low real-time performance, delay uncertainty, and other disadvantages. This is the problem that the technology in the present disclosure can resolve.

SUMMARY

In order to resolve the technical problems, the present disclosure adopts a periodic time slot scheduling method for a wireless network. Specific steps are as follows:

step 1: connecting a network SN with f nodes by using a wireless network:

step 2: constructing time slot parameter sets of nodes in the wireless network and an interval array between time slots of each of the nodes:

step 3: calculating an acceptable total time interval of each of the nodes in the wireless network, selecting a node with a minimum acceptable total time interval in the wireless network as a time slot allocation node, allocating a time slot for each time slot request of the time slot allocation node, and allocating a time slot for each time slot request of a remaining node except the time slot allocation node in the wireless network; and step 4: detecting and determining a delay of time slot allocation.

Preferably, step 1 specifically includes:

sending, by the f nodes, data by using time slots of a channel in the network SN, where a first time slot is denoted as time slot 0, a second time slot is denoted as time slot 1, and so on; and each time slot is marked in chronological order, and therefore is marked with a time slot number.

Preferably, the time slot parameter sets of the nodes in the wireless network in step 2 are defined as follows:

$$\text{data}_{i,k} = \{BN_{i,k}, SN_{i,k}, BSN_{i,k}\}, i \in [1,f], k \in [1,L]$$

where $\text{data}_{i,k}$ represents a time slot parameter set of node $N_i$ at a $k^{th}$ time point in the wireless network, $BN_{i,k}$ represents a total quantity of backoffs of node $N_i$ at the $k^{th}$ time point in the wireless network, $SN_{i,k}$ represents a maximum quantity of steps backed off by node $N_i$ at the $k^{th}$ time point in the wireless network, $BSN_{i,k}$ represents a total quantity of steps backed off by node $N_i$ at the $k^{th}$ time point in the wireless network, f represents a quantity of the nodes in the wireless network, and L represents a quantity of time points;

for any node $N_i$, $NT_i$ time slots are required to send data, wherein $i \in [1, f]$;

the interval array between the time slots of each of the nodes in step 2 is defined as follows:

$$M_i = \{m_{i,0,1}, m_{i,1,2}, m_{i,2,3}, \ldots, m_{i,NT_i-1,NT_i}\}$$

where $M_i$ represents an interval array between time slots of node $N_i$ in the wireless network, $m_{i,0,1}$ represents a maximum quantity of time slots that can by skipped by node $N_i$ in the wireless network after a requested time slot of node $N_i$ in the wireless network is allocated, $m_{i,j,j+1}$ represents a maximum interval between to-be-allocated $(j+1)^{th}$ and $j^{th}$ time slots requested by node $N_i$ in the wireless network, and $i \in [1, f]$;

$j \in [1, NT_i]$, f represents the quantity of the nodes in the wireless network, and $NT_i$ represents a quantity of time slots requested by node $N_i$ in the wireless network;

$BN_{i,k}$, namely, the backoff, means that during time slot allocation for node $N_{i,k}$, due to existence of another node, a time slot required by node $N_{i,k}$ is occupied, resulting in delayed allocation of the time slot required by node $N_{i,k}$; $BSN_{i,k}$ represents a total quantity of backoffs of node $N_{i,k}$ before next time slot allocation; and a total quantity of backoffs of each node is 0 at the beginning of time slot allocation;

$SN_{i,k}$ represents a maximum time slot interval of a backoff of node $N_{i,k}$ before next time slot allocation, and a maximum quantity of steps backed off by each node is 0 at the beginning of time slot allocation;

$BSN_{i,k}$ represents a total quantity of steps backed off by node $N_{i,k}$ before next time slot allocation, and a total quantity of steps backed off by each node is 0 at the beginning of time slot allocation; and $M_i$ represents a required allocation interval for each time slot of node $N_{i,k}$, and for node $N_{i,k}$ that requires $NT_{i,k}$ time slots, a required interval set M constituted by a required interval between any two adjacent time slots is as follows:

$$M_i = \{m_{i,0,1}, m_{i,1,2}, m_{i,2,3}, \ldots, m_{i,NT_i-1,NT_i}\}$$

Preferably, the calculating an acceptable total time interval of each of the nodes in the wireless network in step 3 is specifically performed according to the following formula:

$$M'_i = \sum_{j=0}^{NT_{i,k}-1} m'_{i,j,k}, i \in [1, f], j \in [1, NT_i]$$

where $M'_i$ represents an acceptable total time interval of node $N_i$, $m'_{i,j,k}$ represents a maximum quantity of time slots that can be skipped by node $N_i$ at a $k^{th}$ time point in the wireless network after time slot allocation, $j \in [1, NT_i]$, $NT_{i,k}$ represents a total quantity of time slot requests of node $N_i$ at the $k^{th}$ time point in the wireless network, f represents a quantity of the nodes in the wireless network, $NT_i$ represents a quantity of time slots requested by node $N_i$ in the wireless network, and k represents the $k^{th}$ time point;

the selecting a node with a minimum acceptable total time interval in the wireless network as a time slot allocation node in step 3 specifically includes:

selecting a minimum value in $M'_1, M'_2, \ldots,$ and $M'_f$ as $M'_{min}$; and determining a $min^{th}$ node in the wireless network as the time slot allocation node;

the allocating a time slot for each time slot request of the time slot allocation node in step 3 specifically includes:

allocating time slot 0 for a first time slot request of the $min^{th}$ node in the wireless network; and allocating, according to the following formula, a time slot for each of time slot requests starting from a second time slot request of the $min^{th}$ node in the wireless network:

$$m_{min,0}, \sum_{j=0}^{1} m_{min,j}, \sum_{j=0}^{2} m_{min,j}, \ldots, \sum_{j=0}^{NT_i-2} m_{min,j}, \sum_{j=0}^{NT_i-1} m_{min,j}$$

where $m_{min,j}$ represents a maximum quantity of time slots that can be skipped by the $min^{th}$ node after a $j^{th}$ time slot is allocated to the $min^{th}$ node at the $k^{th}$ time point, and a number of the allocated time slot and a time slot number corresponding to the maximum quantity of time slots that can be skipped are added up; and the allocating a time slot for each time slot request of a remaining node except the time slot allocation node in the wireless network in step 3 specifically includes:

step 3.1: for the remaining node except the time slot allocation node in the wireless network, calculating a time slot allocation weight parameter $Q_{i,k}$ of any node $N_{i,k}$ that has not assigned a time slot, based on a corresponding required interval set $M_{i,k}$ of node $N_{i,k}$ and a time slot occupied by a node that has been assigned a time slot:

$$Q_{i,k} = M_{i,k} * \frac{SN_{i,k}}{\text{Max}(SN_{i,k})} * \frac{BSN_{i,k}}{\text{Max}(BSN_{i,k})}$$

where $$\frac{SN_{i,k}}{\text{Max}(SN_{i,k})}$$

represents a coefficient of the total quantity of backoffs, and $$\frac{BSN_{i,k}}{\text{Max}(BSN_{i,k})}$$

represents a coefficient of the maximum quantity of steps backed off;

step 3.2: obtaining node $N'_{i,k}$ with a smallest value of $Q_{i,k}$ among all nodes to be assigned time slots, and allocating a time slot for node $N'_{i,k}$, where if there are nodes with a same value of $Q_{i,k}$, a node with a smallest value of $M_{i,k}$ is selected for allocation; and repeating steps 3.1 and 3.2 until all the nodes are assigned required time slots.

Preferably, the detecting and determining a delay of time slot allocation in step 4 includes:

for a time slot allocation result obtained in step 3, for a required interval set M of any node $N_i$, if time slot k is allocated for a $j^{th}$ time slot request of node $N_i$, and time slot k' is allocated for a $(j+1)^{th}$ time slot request of node $N_i$, performing the following steps:

detecting a step delay according to the following formula: $m_{ij}=k'-k$; and determining the step delay, where if $m_{ij}>m_{ij}$, it indicates that time slot allocation for node $N_i$ is delayed; or if $m_{ij}>m_{ij}$ does not occur for node $N_i$, it indicates that time slot allocation for node $N_i$ is not delayed; where $m_{ij}$ represents the $j^{th}$ time slot request of node $N_i$.

k represents the time slot allocated for the $j^{th}$ time slot request of node $N_i$; and k' represents the time slot allocated for the $(j+1)^{th}$ time slot request of node $N_i$.

The present disclosure has the following beneficial effects:

The present disclosure designs clear parameters for a time slot request of a node, and quantifies the time slot request by using the parameters. A cost of time slot allocation is calculated based on quantitative parameters, and time slot allocation is carried out through quantitative analysis.

The present disclosure has the following features:

Parameterized allocation is realized. The present disclosure quantifies time slot allocation in a parameterized way, which makes an allocation process clearer.

Both efficiency and fairness are ensured. The quantitative analysis method in the present disclosure can effectively improve efficiency and ensure that a time slot allocation request of each node can be met as much as possible, so as to ensure the efficiency and fairness.

DETAILED DESCRIPTION OF THE EMBODIMENTS

Figure 1:
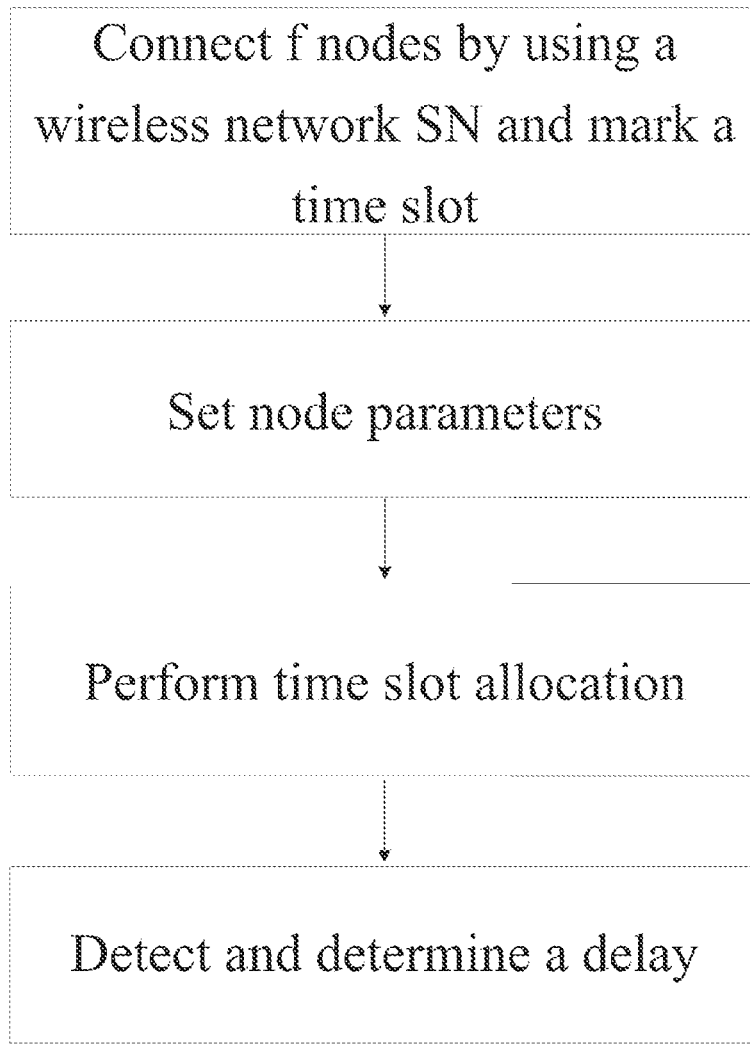
FIG. 1 shows overall implementation steps of the present disclosure.

To make the objectives, technical solutions, and advantages of the present disclosure clearer, the present disclosure is further described below in detail with reference to the drawings and embodiments. It should be understood that the specific embodiments described herein are only used to explain the present disclosure, but not to limit the present disclosure. That is, the described embodiments are only some rather than all embodiments of the present disclosure. All other embodiments obtained by a person of ordinary skill in the art based on the embodiments of the present disclosure without creative efforts shall fall within the protection scope of the present disclosure.

A first embodiment of the present disclosure provides a periodic time slot scheduling method for a wireless network. A specific implementation of the method is as follows:

Step 1: Connect a network SN with f nodes by using a wireless network.

The f nodes send data by using time slots of a channel in the network SN, where a first time slot is denoted as time slot 0, a second time slot is denoted as time slot 1, and so on; and each time slot is marked in chronological order, and therefore is marked with a time slot number.

Step 2: Construct time slot parameter sets of nodes in the wireless network and an interval array between time slots of each of the nodes.

For any node $N_i$, $NT_i$ time slots are required to send data, where $i \in [1, f]$.

The time slot parameter sets of the nodes in the wireless network in step 2 are defined as follows:

$$data_{i,k} = \{BN_{i,k}, SN_{i,k}, BSN_{i,k}\}, i \in [1,f], k \in [1,L]$$

where $data_{i,k}$ represents a time slot parameter set of node $N_i$ at a $k^{th}$ time point in the wireless network, $BN_{i,k}$ represents a total quantity of backoffs of node $N_i$ at the $k^{th}$ time point in the wireless network, $SN_{i,k}$ represents a maximum quantity of steps backed off by node $N_i$ at the $k^{th}$ time point in the wireless network, $BSN_{i,k}$ represents a total quantity of steps backed off by node $N_i$ at the $k^{th}$ time point in the wireless network, f represents a quantity of the nodes in the wireless network, and L represents a quantity of time points.

The intervalarray between the time slots of each of the nodes in step 2 is defined as follows:

$$M_i = \{m_{i,0,1}, m_{i,1,2}, m_{i,2,3}, \ldots, m_{i,NT_i-1,NT_i}\}$$

where $M_i$ represents an interval array between time slots of node $N_i$ in the wireless network, $m_{i,0,1}$ represents a maximum quantity of time slots that can by skipped by node $N_i$ in the wireless network after a requested time slot of node $N_i$ in the wireless network is allocated, $M_{i,j,j+1}$ represents a maximum interval between to-be-allocated $(j+1)^{th}$ and $j^{th}$ time slots requested by node $N_i$ in the wireless network, and $i \in [1, f]$;

$j \in [1, NT_i]$, f represents the quantity of the nodes in the wireless network, and $NT_i$ represents a quantity of time slots requested by node $N_i$ in the wireless network;

$BN_{i,k}$, namely, the backoff, means that during time slot allocation for node $N_{i,k}$, due to existence of another node, a time slot required by node $N_{i,k}$ is occupied, resulting in delayed allocation of the time slot required by node $N_{i,k}$; $BSN_{i,k}$ represents a total quantity of backoffs of node $N_{i,k}$ before next time slot allocation; and a total quantity of backoffs of each node is 0 at the beginning of time slot allocation;

$SN_{i,k}$ represents a maximum time slot interval of a backoff of node $N_{i,k}$ before next time slot allocation, and a maximum quantity of steps backed off by each node is 0 at the beginning of time slot allocation.

$BSN_{i,k}$ represents a total quantity of steps backed off by node $N_{i,k}$ before next time slot allocation, and a total quantity of steps backed off by each node is 0 at the beginning of time slot allocation, and $M_i$ represents a required allocation interval for each time slot of node $N_{i,k}$, and for node $N_{i,k}$ that requires $NT_{i,k}$ time slots, a required interval set M constituted by a required interval between any two adjacent time slots is as follows:

$$M_i = \{m_{i,0,1}, m_{i,1,2}, m_{i,2,3}, \ldots, m_{i,NT_i-1,NT_i}\}$$

If a quantity of time slots skipped when node $N_{i,k}$ waits for allocation of any time slot exceeds a corresponding time interval, it indicates that there is an allocation delay.

Step 3: Calculate an acceptable total time interval of each of the nodes in the wireless network, select a node with a minimum acceptable total time interval in the wireless network as a time slot allocation node, allocate a time slot for each time slot request of the time slot allocation node, and allocate a time slot for each time slot request of a remaining node except the time slot allocation node in the wireless network.

The calculating an acceptable total time interval of each of the nodes in the wireless network in step 3 is specifically performed according to the following formula:

$$M'_i = \sum_{j=0}^{NT_{i,k}-1} m'_{i,j,k}, i \in [1, f], j \in [1, NT_i]$$

where $M'_i$ represents an acceptable total time interval of node $N_i$, $m'_{i,j,k}$ represents a maximum quantity of time slots that can be skipped by node $N_i$ at the $k^{th}$ time point in the wireless network after time slot allocation, $j \in [1, NT_i]$, $NT_{i,k}$ represents a total quantity of time slot requests of node $N_i$ at the $k^{th}$ time point in the wireless network, f represents the quantity of the nodes in the wireless network, $NT_i$ represents the quantity of time slots requested by node $N_i$ in the wireless network, and k represents the $k^{th}$ time point.

The selecting a node with a minimum acceptable total time interval in the wireless network as a time slot allocation node in step 3 specifically includes:

selecting a minimum value in $M'_1, M'_2, \ldots,$ and $M'_f$ as $M'_{min}$; and determining a $min^{th}$ node in the wireless network as the time slot allocation node.

The allocating a time slot for each time slot request of the time slot allocation node in step 3 specifically includes:

allocating time slot 0 for a first time slot request of the $min^{th}$ node in the wireless network; and allocating, according to the following formula, a time slot for each of time slot requests starting from a second time slot request of the $min^{th}$ node in the wireless network:

$$m_{min,0}, \sum_{j=0}^{1} m_{min,j}, \sum_{j=0}^{2} m_{min,j}, \ldots, \sum_{j=0}^{NT_i-2} m_{min,j}, \sum_{j=0}^{NT_i-1} m_{min,j}$$

Where $m_{min,j}$ represents a maximum quantity of time slots that can be skipped by the $min^{th}$ node after a $j^{th}$ time slot is allocated to the $min^{th}$ node at the $k^{th}$ time point, and a number of the allocated time slot and a time slot number corresponding to the maximum quantity of time slots that can be skipped are added up.

The allocating a time slot for each time slot request of a remaining node except the time slot allocation node in the wireless network in step 3 specifically includes:

Step 3.1: For the remaining node except the time slot allocation node in the wireless network, calculate a time slot allocation weight parameter $Q_{i,k}$ of any node $N_{i,k}$ that has not assigned a time slot, based on a corresponding required interval set $M_{i,k}$ of node $N_{i,k}$ and a time slot occupied by a node that has been assigned a time slot:

$$Q_{i,k} = M_{i,k} * \frac{SN_{i,k}}{Max(SN_{i,k})} * \frac{BSN_{i,k}}{Max(BSN_{i,k})}$$

where $$\frac{SN_{i,k}}{Max(SN_{i,k})}$$

represents a coefficient of the total quantity of backoffs, and $$\frac{BSN_{i,k}}{Max(BSN_{i,k})}$$

represents a coefficient of the maximum quantity of steps backed off.

Step 3.2: Obtain node $N'_{i,k}$ with a smallest value of $Q_{i,k}$ among all nodes to be assigned time slots, and allocate a time slot for node $N'_{i,k}$, where if there are nodes with a same value of $Q_{i,k}$, a node with a smallest value of $M_{i,k}$ is selected for allocation.

Steps 3.1 and 3.2 are repeated until all the nodes are assigned required time slots.

Step 4: Detect and determine a delay of time slot allocation.

The detecting and determining a delay of time slot allocation in step 4 includes:

for a time slot allocation result obtained in step 3, for a required interval set M of any node $N_i$, if time slot k is allocated for a $j^{th}$ time slot request of node $N_i$, and time slot k' is allocated for a $(j+1)^{th}$ time slot request of node $N_i$, performing the following steps:

detecting a step delay according to the following formula: $m_{ij}=k'-k$; and determining the step delay, where if $m_{ij} > m_{ij}$, it indicates that time slot allocation for node $N_i$ is delayed; or if $m_{ij} > m_{ij}$ does not occur for node $N_i$, it indicates that time slot allocation for node $N_i$ is not delayed; where $m_{ij}$ represents the $j^{th}$ time slot request of node $N_i$;

k represents the time slot allocated for the $j^{th}$ time slot request of node $N_i$; and k' represents the time slot allocated for the $(j+1)_{th}$ time slot request of node $N_i$.

A second specific embodiment of the present disclosure is described below with reference to FIG. 1 to FIG. 5. The second specific embodiment of the present disclosure is as follows:

Step 1: Connect a network SN with f nodes by using a wireless network.

The f nodes send data by using time slots of a channel in the network SN, where a first time slot is denoted as time slot 0, a second time slot is denoted as time slot 1, and so on; and each time slot is marked in chronological order, and therefore is marked with a time slot number.

During actual implementation, the time slots can be re-marked from 0 based on a use requirement.

Figure 2:
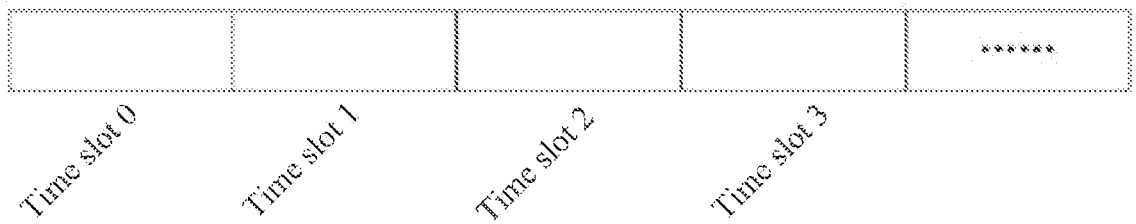
FIG. 2 shows a time slot marking manner according to the present disclosure.

For example, the time slots may be numbered 0, 1, 2, 3, and the like, as shown in FIG. 2.

Step 2: For any node $N_i$ (0<i<=f), send data by using $NT_i$ time slots, and set the following parameters:

Step 2.1: Set $BN_i$, namely, a total quantity of backoffs.

The backoff means that during time slot allocation for node $N_i$, due to existence of another node, a time slot required by node $N_i$ is occupied, resulting in delayed allocation of the time slot required by node $N_i$. $BN_i$ represents a total quantity of backoffs of node $N_i$ before next time slot allocation. A total quantity of backoffs of each node is 0 at the beginning of time slot allocation.

Step 2.2: Set $SN_i$, namely, a maximum quantity of steps backed off.

$SN_i$ represents a maximum time slot interval of a backoff of node $N_i$ before next time slot allocation. A maximum quantity of steps backed off by each node is 0 at the beginning of time slot allocation.

Step 2.3: Set $BSN_i$, namely, a total quantity of steps backed off.

$BSN_i$ represents a total quantity of steps backed off by node $N_i$ before next time slot allocation. A total quantity of steps backed off by each node is 0 at the beginning of time slot allocation.

Step 2.4: Set a required interval between corresponding time slots of node $N_i$.

For node $N_i$, there is a required allocation interval for each time slot of node $N_i$, and for node $N_i$ that requires $NT_i$ time slots, a required interval set M constituted by a required interval between any two adjacent time slots is as follows:

$$M(N_i) = \{m_{i,0}, m_{i,1}, \ldots, m_{i,NT_i-1}\}$$

where $m_{i,0}$ represents a maximum quantity of time slots that can be skipped by node $N_i$ after a time slot requested by node $N_i$ is allocated; $m_{i,1}$ represents a maximum interval between a second to-be-allocated time slot and a first to-be-allocated time slot; $m_{i,2}$ represents a maximum interval between a third to-be-allocated time slot and the second to-be-allocated time slot; and by analogy, $m_{i,NT_i-1}$ represents a maximum interval between a last to-be-allocated time slot and a penultimate to-be-allocated time slot.

If a quantity of time slots skipped when node $N_i$ waits for allocation of any time slot exceeds a corresponding time interval, it indicates that there is an allocation delay.

For example, for a network with three nodes (f=3), namely, $N_1$, $N_2$ and $N_3$, corresponding parameters are shown in Table 1:

TABLE 1

Network with three nodes (f = 3)

| Node | $BN_i$ | $SN_i$ | $BSN_i$ | M |
|---|---|---|---|---|
| $N_1$ | 0 | 0 | 0 | $M(N_1) = \{2, 4\}$ |
| $N_2$ | 0 | 0 | 0 | $M(N_2) = \{1, 4, 3\}$ |
| $N_3$ | 0 | 0 | 0 | $M(N_3) = \{1, 3, 3\}$ |

Step 3: Perform time slot allocation.

Step 3.1: Calculate an acceptable total time interval of each of the f nodes according to the following formula:

$$M_i = \sum_{j=0}^{NT_i-1} m_{i,j}$$

For the nodes in Table 1, corresponding parameters are shown in Table 2.

TABLE 2

Parameters of the three nodes

| Node | M | $M_i$ |
|---|---|---|
| $N_1$ | $M(N_1) = \{2, 4\}$ | 6 |
| $N_2$ | $M(N_2) = \{1, 4, 3\}$ | 8 |
| $N_3$ | $M(N_3) = \{1, 3, 3\}$ | 7 |

Step 3.2: Select a node with a smallest value of $M_i$, and allocate a time slot for each time slot request of the node, where time slot 0 is allocated for a first time slot request, and a remaining time slot request is calculated according to $M(N_i)$ and assigned a corresponding time slot.

Figure 3:
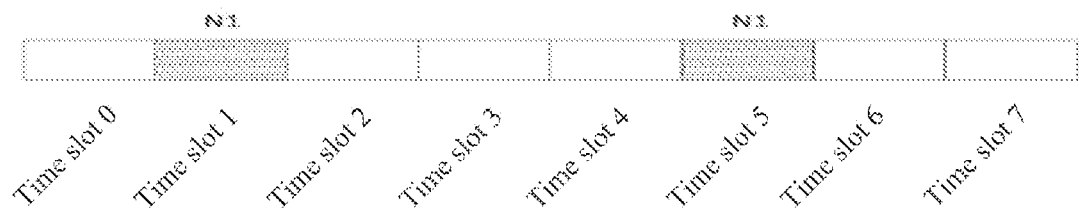
FIG. 3 shows a situation after time slot allocation is completed for node $N_1$.

Based on Table 1 and Table 2, $N_1$ currently has a smallest value of $M_1$, and allocation is performed for $N_1$. An allocation result shown in FIG. 3 is obtained.

Step 3.3: For a remaining node, calculate any node $N_i$ that is assigned a time slot, and calculate, according to the following formula, a time slot allocation weight parameter $Q_i$ of node $N_i$ based on a corresponding required interval set M of node $N_i$ and a time slot occupied by a node that has been assigned a time slot:

$$Q_i = M_i * \frac{SN_i}{Max(SN_i)} * \frac{BSN_i}{Max(BSN_i)}$$

where $$\frac{SN_i}{Max(SN_i)}$$

represents a coefficient of the total quantity of backoffs, and $$\frac{BSN_i}{Max(BSN_i)}$$

represents a coefficient of the maximum quantity of steps backed off.

Based on Table 1 and Table 2, a calculation result shown in Table 3 can be obtained.

TABLE 3

Parameters of two nodes

| Node | $BN_i$ | $SN_i$ | $BSN_i$ | M |
|---|---|---|---|---|
| $N_2$ | 0 | 0 | 0 | $M(N_2) = \{1, 4, 3\}$ |
| $N_3$ | 0 | 0 | 0 | $M(N_3) = \{1, 3, 3\}$ |

Step 3.4: Obtain node $N_i'$ with a smallest value of $Q_i$ among all nodes to be assigned time slots, and allocate a time slot for node $N_i'$, where if there are nodes with a same value of $Q_i$, a node with a smallest value of $M_i$ is selected for allocation.

Figure 4:
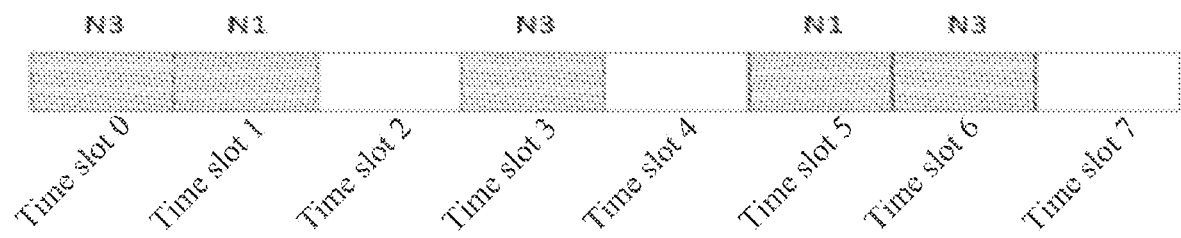
FIG. 4 shows a situation after time slot allocation is completed for node $N_2$.

Based on Table 1, Table 2, Table 3, and Table 4, slot allocation for $N_1$ does not cause occupation to slot allocation for $N_2$ and $N_3$. Both $Q_2$ corresponding to $N_2$ and $Q_3$ corresponding to node $N_3$ are 0. Since $M_2 > M_3$, an allocation result of $N_3$ is shown in FIG. 4.

Step 3.5: Repeat steps 3.3 and 3.4 until all the nodes are assigned required time slots.

Finally, time slot allocation is completed for $N_2$.

Step 4: Detect and determine a delay.

For a time slot allocation result obtained in step 3, for a required interval set M of any node $N_i$, if time slot k is allocated for a $j^{th}$ time slot request of node $N_i$, and time slot k' is allocated for a $(j+1)^{th}$ time slot request of node $N_i$, calculation is performed according to the following formula:

$$m_{ij}' = k' - k$$

where if $m_{ij}' > m_{ij}$, it indicates that time slot allocation for node $N_i$ is delayed; or if $m_{ij}' > m_{ij}$ does not occur for node $N_i$, it indicates that time slot allocation for node $N_i$ is not delayed.

Figure 5:
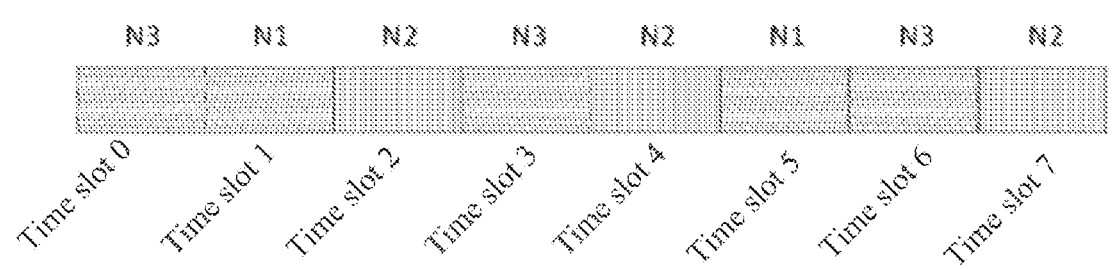
FIG. 5 shows a situation after time slot allocation is completed for node $N_3$.

Based on allocation results of the nodes shown in Table 1, calculation can be performed, as shown in FIG. 5.

TABLE 4

Required interval sets of the three nodes and corresponding intervals after actual allocation

| Node | M | Interval after actual allocation |
|---|---|---|
| $N_1$ | $M(N_1) = \{2, 4\}$ | $\{2, 4\}$ |
| $N_2$ | $M(N_2) = \{1, 4, 3\}$ | $\{3, 2, 3\}$ |
| $N_3$ | $M(N_3) = \{1, 3, 3\}$ | $(1, 3, 3)$ |

It can be seen from Table 4 that $N_2$ has a delay of one time slot.

The specific embodiments described in the present disclosure are merely illustrative of the spirit of the present disclosure. A person skilled in the art can make various modifications or supplements to the specific embodiments described or replace them in a similar manner, but it may not depart from the spirit of the present disclosure or the scope defined by the appended claims.

What is claimed is:

1. A periodic time slot scheduling method for a wireless network, comprising the following specific steps:
    step 1: connecting a network SN with f nodes by using a wireless network;
    step 2: constructing time slot parameter sets of nodes in the wireless network and an interval array between time slots of each of the nodes;
    step 3: calculating an acceptable total time interval of each of the nodes in the wireless network, selecting a node with a minimum acceptable total time interval in the wireless network as a time slot allocation node, allocating a time slot for each time slot request of the time slot allocation node, and allocating a time slot for each time slot request of a remaining node except the time slot allocation node in the wireless network; and step 4: detecting and determining a delay of time slot allocation.

2. The periodic time slot scheduling method for a wireless network according to claim 1, wherein step 1 specifically comprises:
sending, by the f nodes, data by using time slots of a channel in the network SN, wherein a first time slot is denoted as time slot 0, a second time slot is denoted as time slot 1, and so on; and each time slot is marked in chronological order, and therefore is marked with a time slot number.

3. The periodic time slot scheduling method for a wireless network according to claim 1, wherein the time slot parameter sets of the nodes in the wireless network in step 2 are defined as follows:

$$data_{i,k} = \{BN_{i,k}, SN_{i,k}, BSN_{i,k}\}, i \in [1,f], k \in [1,L]$$

wherein $data_{i,k}$ represents a time slot parameter set of node $N_i$ at a $k^{th}$ time point in the wireless network, $BN_{i,k}$ represents a total quantity of backoffs of node $N_i$ at the $k^{th}$ time point in the wireless network, $SN_{i,k}$ represents a maximum quantity of steps backed off by node $N_i$ at the $k^{th}$ time point in the wireless network, $BSN_{i,k}$ represents a total quantity of steps backed off by node $N_i$ at the $k^{th}$ time point in the wireless network, f represents a quantity of the nodes in the wireless network, and L represents a quantity of time points;

for any node $N_i$, $NT_i$ time slots are required to send data, wherein $i \in [1, f]$;

the interval array between the time slots of each of the nodes in step 2 is defined as follows:

$$M_i = \{m_{i,0,1}, m_{i,1,2}, m_{i,2,3}, \ldots, m_{i,NT_i-1,NT_i}\}$$

wherein $M_i$ represents an interval array between time slots of node $N_i$ in the wireless network, $m_{i,0,1}$ represents a maximum quantity of time slots that can by skipped by node $N_i$ in the wireless network after a requested time slot of node $N_i$ in the wireless network is allocated, $m_{i,j,j+1}$ represents a maximum interval between to-be-allocated $(j+1)^{th}$ and $j^{th}$ time slots requested by node $N_i$ in the wireless network, and $i \in [1, f]$; $j \in [1, NT_i]$, f represents the quantity of the nodes in the wireless network, and $NT_i$ represents a quantity of time slots requested by node $N_i$ in the wireless network;

$BN_{i,k}$, namely, the backoff, means that during time slot allocation for node $N_{i,k}$, due to existence of another node, a time slot required by node $N_{i,k}$ is occupied, resulting in delayed allocation of the time slot required by node $N_{i,k}$; $BSN_{i,k}$ represents a total quantity of backoffs of node $N_{i,k}$ before next time slot allocation; and a total quantity of backoffs of each node is 0 at the beginning of time slot allocation;

$SN_{i,k}$ represents a maximum time slot interval of a backoff of node $N_{i,k}$ before next time slot allocation, and a maximum quantity of steps backed off by each node is 0 at the beginning of time slot allocation;

$BSN_{i,k}$ represents a total quantity of steps backed off by node $N_{i,k}$ before next time slot allocation, and a total quantity of steps backed off by each node is 0 at the beginning of time slot allocation; and $M_i$ represents a required allocation interval for each time slot of node $N_{i,k}$, and for node $N_{i,k}$ that requires $NT_{i,k}$ time slots, a required interval set M constituted by a required interval between any two adjacent time slots is as follows:

$$M_i = \{m_{i,0,1}, m_{i,1,2}, m_{i,2,3}, \ldots, m_{i,NT_i-1,NT_i}\}$$

4. The periodic time slot scheduling method for a wireless network according to claim 1, wherein the detecting and determining a delay of time slot allocation in step 4 comprises:
for a time slot allocation result obtained in step 3, for a required interval set M of any node $N_i$, if time slot k is allocated for a $j^{th}$ time slot request of node $N_i$, and time slot k' is allocated for a $(j+1)^{th}$ time slot request of node $N_i$, performing the following steps:
detecting a step delay according to the following formula: $m_{ij} = k' - k$; and
determining the step delay, wherein
if $m_{ij'} > m_{ij}$, it indicates that time slot allocation for node $N_i$ is delayed; or
if $m_{ij'} > m_{ij}$ does not occur for node $N_i$, it indicates that time slot allocation for node $N_i$ is not delayed; wherein
$m_{ij}$ represents the $j^{th}$ time slot request of node $N_i$;
k represents the time slot allocated for the $j^{th}$ time slot request of node $N_i$; and
k' represents the time slot allocated for the $(j+1)^{th}$ time slot request of node $N_i$.

5. The periodic time slot scheduling method for a wireless network according to claim 1, wherein the calculating an acceptable total time interval of each of the nodes in the wireless network in step 3 is specifically performed according to the following formula:

$$M'_i = \sum_{j=0}^{NT_{i,k}-1} m'_{i,j,k}, i \in [1, f], j \in [1, NT_i]$$

wherein $M'_i$ represents an acceptable total time interval of node $N_i$, $m'_{i,j,k}$ represents a maximum quantity of time slots that can be skipped by node $N_i$ at a $k^{th}$ time point in the wireless network after time slot allocation, $j \in [1, NT_i]$, $NT_{i,k}$ represents a total quantity of time slot requests of node $N_i$ at the $k^{th}$ time point in the wireless network, f represents a quantity of the nodes in the wireless network, $NT_i$ represents a quantity of time slots requested by node $N_i$ in the wireless network, and k represents the $k^{th}$ time point;

the selecting a node with a minimum acceptable total time interval in the wireless network as a time slot allocation node in step 3 specifically comprises:
selecting a minimum value in $M'_1, M'_2, \ldots,$ and $M'_f$ as $M'_{min}$; and
determining a $min^{th}$ node in the wireless network as the time slot allocation node;
the allocating a time slot for each time slot request of the time slot allocation node in step 3 specifically comprises:
allocating time slot 0 for a first time slot request of the $min^{th}$ node in the wireless network; and
allocating, according to the following formula, a time slot for each of time slot requests starting from a second time slot request of the $min^{th}$ node in the wireless network:

$$m_{min,0}, \sum_{j=0}^{1} m_{min,j}, \sum_{j=0}^{2} m_{min,j}, \ldots, \sum_{j=0}^{NT_i-2} m_{min,j}, \sum_{j=0}^{NT_i-1} m_{min,j}$$

wherein $m_{min,j}$ represents a maximum quantity of time slots that can be skipped by the $min^{th}$ node after a $j^{th}$ time slot is allocated to the $min^{th}$ node at the $k^{th}$ time point, and a number of the allocated time slot and a time slot number corresponding to the maximum quantity of time slots that can be skipped are added up; and the allocating a time slot for each time slot request of a remaining node except the time slot allocation node in the wireless network in step 3 specifically comprises:

step 3.1: for the remaining node except the time slot allocation node in the wireless network, calculating a time slot allocation weight parameter $Q_{i,k}$ of any node-$N_{i,k}$ that has not assigned a time slot, based on a corresponding required interval set $M_{i,k}$ of node $N_{i,k}$ and a time slot occupied by a node that has been assigned a time slot:

$$Q_{i,k} = M_{i,k} * \frac{SN_{i,k}}{\text{Max}(SN_{i,k})} * \frac{BSN_{i,k}}{\text{Max}(BSN_{i,k})}$$

wherein $$\frac{SN_{i,k}}{\text{Max}(SN_{i,k})}$$

represents a coefficient of the total quantity of backoffs, and $$\frac{BSN_{i,k}}{\text{Max}(BSN_{i,k})}$$

represents a coefficient of the maximum quantity of steps backed off;

step 3.2: obtaining node $N'_{i,k}$ with a smallest value of $Q_{i,k}$ among all nodes to be assigned time slots, and allocating a time slot for node $N'_{i,k}$ wherein if there are nodes with a same value of $Q_{i,k}$, a node with a smallest value of $M_{i,k}$ is selected for allocation; and repeating steps 3.1 and 3.2 until all the nodes are assigned required time slots.

* * * * *